(12) United States Patent
Fukushima

(10) Patent No.: US 12,313,608 B2
(45) Date of Patent: May 27, 2025

(54) AUTOMATIC SAMPLE INJECTION DEVICE

(71) Applicant: Shimadzu Corporation, Kyoto (JP)

(72) Inventor: Daiki Fukushima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 180 days.

(21) Appl. No.: 17/926,303

(22) PCT Filed: Dec. 15, 2020

(86) PCT No.: PCT/JP2020/046721
§ 371 (c)(1),
(2) Date: Nov. 18, 2022

(87) PCT Pub. No.: WO2021/240853
PCT Pub. Date: Dec. 2, 2021

(65) Prior Publication Data
US 2023/0280315 A1 Sep. 7, 2023

(30) Foreign Application Priority Data

May 25, 2020 (JP) .................. 2020-090659

(51) Int. Cl.
G01N 35/10 (2006.01)
G01N 30/24 (2006.01)

(52) U.S. Cl.
CPC ......... *G01N 30/24* (2013.01); *G01N 35/1095* (2013.01)

(58) Field of Classification Search
None
See application file for complete search history.

(56) References Cited

U.S. PATENT DOCUMENTS

2018/0059071 A1* 3/2018 Murata ............... G01N 30/24
2018/0180607 A1* 6/2018 Kubo ............... G01N 35/0098
(Continued)

FOREIGN PATENT DOCUMENTS

CN 110988375 A 4/2020
JP 2000-97947 A 4/2000
(Continued)

OTHER PUBLICATIONS

Second Office Action dated Apr. 25, 2024 for the Chinese Patent Application No. 202080100541.5.
(Continued)

*Primary Examiner* — Alexander A Mercado
(74) *Attorney, Agent, or Firm* — Muir Patent Law, PLLC

(57) ABSTRACT

An automatic sample injection device is configured to perform an injection operation of a sample to an analyzer by a sampling mechanism (2) for sucking and dispensing a solvent. The automatic sample injection device is provided with solvent arrangement locations (14) at which a plurality of solvents each accommodated in a vial is arranged, a method setting unit (16) configured to set a method of a predetermined operation using a solvent based on information input by a user, a solvent arrangement setting unit (20) configured to set the number or types of solvents to be arranged at the solvent arrangement locations; and a control unit (6) configured to control the sampling mechanism to execute the predetermined operation with a method set by the method setting unit.

4 Claims, 3 Drawing Sheets

(56) References Cited

U.S. PATENT DOCUMENTS

| | | | |
|---|---|---|---|
| 2018/0188217 A1 | 7/2018 | Maze et al. | |
| 2020/0098552 A1* | 3/2020 | Young | H01J 49/00 |
| 2020/0110063 A1 | 4/2020 | Fukushima et al. | |

FOREIGN PATENT DOCUMENTS

| | | |
|---|---|---|
| JP | 2015135240 A | 7/2015 |
| JP | 2020-56725 A | 4/2020 |

OTHER PUBLICATIONS

Chinese First Office Action for application No. CN 202080100541.5 dated Aug. 1, 2023.

* cited by examiner

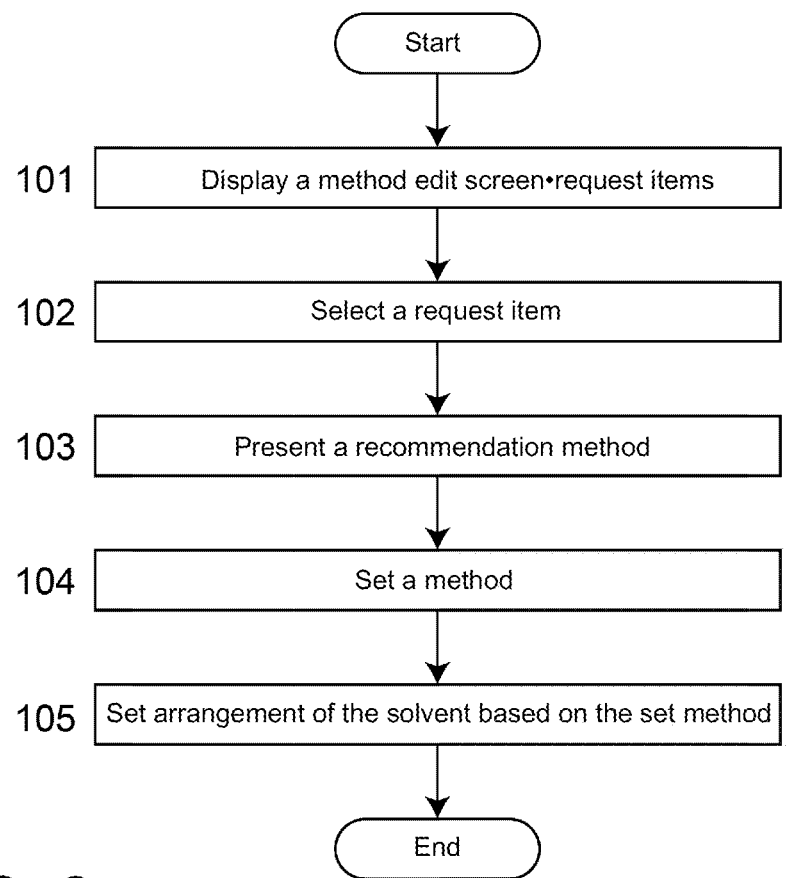

FIG. 4

Reduction of carry-over

| Before injection | After injection |
|---|---|
| 0 times | 3 times |
| 0 times | 2 times |
| 2 times | 0 times |
| 1 time | 0 times |

Saving of solvent

| Before injection | After injection |
|---|---|
| 1 time | 3 times |

Use of three types of solvent

| Before injection | After injection |
|---|---|
| 1 time | 1 time |
| 1 time | 1 time |
| 1 time | 1 time |
| 0 times | 0 times |

Use of viscous solvent

| Before injection | After injection |
|---|---|
| 1 time | 1 time |
| 1 time | 2 times |

"A" denotes a low viscosity of solvent

Reduction of carry-over & Saving of solvent

| Before injection | After injection |
|---|---|
| 0 times | 3 times |
| 1 time | 0 times |

Reduction of carry-over & Use of three types of solvents

| Before injection | After injection |
|---|---|
| 1 time | 1 time |
| 1 time | 1 time |
| 0 times | 1 time |
| 1 time | 0 times |

"C" and "D" are the same solvent

AUTOMATIC SAMPLE INJECTION DEVICE

TECHNICAL FIELD

The present invention relates to an automatic sample injection device for injecting a sample into an analyzer, such as, e.g., a gas chromatograph.

BACKGROUND ART

In an analysis system for performing an analysis, such as, e.g., a gas chromatographic analysis, an automatic sample injection device for automatically performing a sample injection operation to an analyzer is used. In such an automatic sample injection device, before performing a sample injection to the gas chromatograph, it is configured to perform cleaning of a sampling mechanism, such as, e.g., a syringe, for sucking and dispensing a liquid using a predetermined solvent and co-washing thereof using the injected sample.

PRIORITY ART DOCUMENT

Patent Document

Patent Document 1: US Patent Application Publication No. 2018/0188217 A1

SUMMARY OF THE INVENTION

Problems to be Solved by the Invention

In a conventional automatic sample injection device, the method of a cleaning operation or the like was determined in advance, and therefore, what the user could do was only increasing or decreasing the number of times of the cleaning operation for each solvent type. However, depending on a user, there was a demand for enhancing the contamination suppression effect by the cleaning operation or a demand for saving the solvent consumption. In order to satisfy such a demand, it is desirable that the method itself of the cleaning operation or the like can be arbitrarily set, but in a conventional automatic sample injection device, the types and the number of solvents to be arranged in the device were fixed. In a case where the types and the number of solvents to be arranged in the device are fixed, when the method of the cleaning operation is changed in response to the user's demand, there occur such problems that the solvent waste occurs or the changed method could not be executed.

The present invention has been made in view of the above-described problems, and an object thereof is to enable a method of a cleaning operation or the like to be arbitrarily set.

In Patent Document 1, in an analysis system, it has been proposed such that a parameter related to an analysis result or the like can be set on a simplified interface to control each device according to the set parameter. With the proposed function, the method can be set to achieve the effects demanded by the user, but it was not able to realize the solvent arrangement suitable for the set method.

Means for Solving the Problems

An automatic sample injection device according to the present invention is configured to perform an injection operation of a sample to an analyzer by a sampling mechanism for sucking and dispensing a solvent. The automatic sample injection device is provided with:

a solvent arrangement unit at on which a plurality of solvents each accommodated in a vial is arranged;

a method setting unit configured to set a method of a predetermined operation using the solvent based on information input by a user;

a solvent arrangement setting unit configured to set the number and types of solvents to be arranged on the solvent arrangement unit; and a control unit configured to control the sampling mechanism to execute the predetermined operation with a method set by the method setting unit.

Effects of the Invention

According to the automatic sample injection device of the present invention, the method setting unit configured to set a method of a predetermined operation using a solvent based on information input by a user and the solvent arrangement setting unit configured to set the number and the types of solvents to be arranged on a solvent arrangement unit are provided, and therefore, the predetermined operation method of a cleaning operation or the like can be arbitrarily set.

BRIEF DESCRIPTION OF THE DRAWINGS

FIG. 2 is a flowchart showing one example of an operation at the time of editing a method according to the example, FIG. 3 is a diagram showing one example of a request item list to be displayed on the display at the time of editing a method according to the example.

FIG. 4 is a diagram showing one example of a recommended method according to the request item to be selected.

EMBODIMENTS FOR CARRYING OUT THE INVENTION

Figure 1:
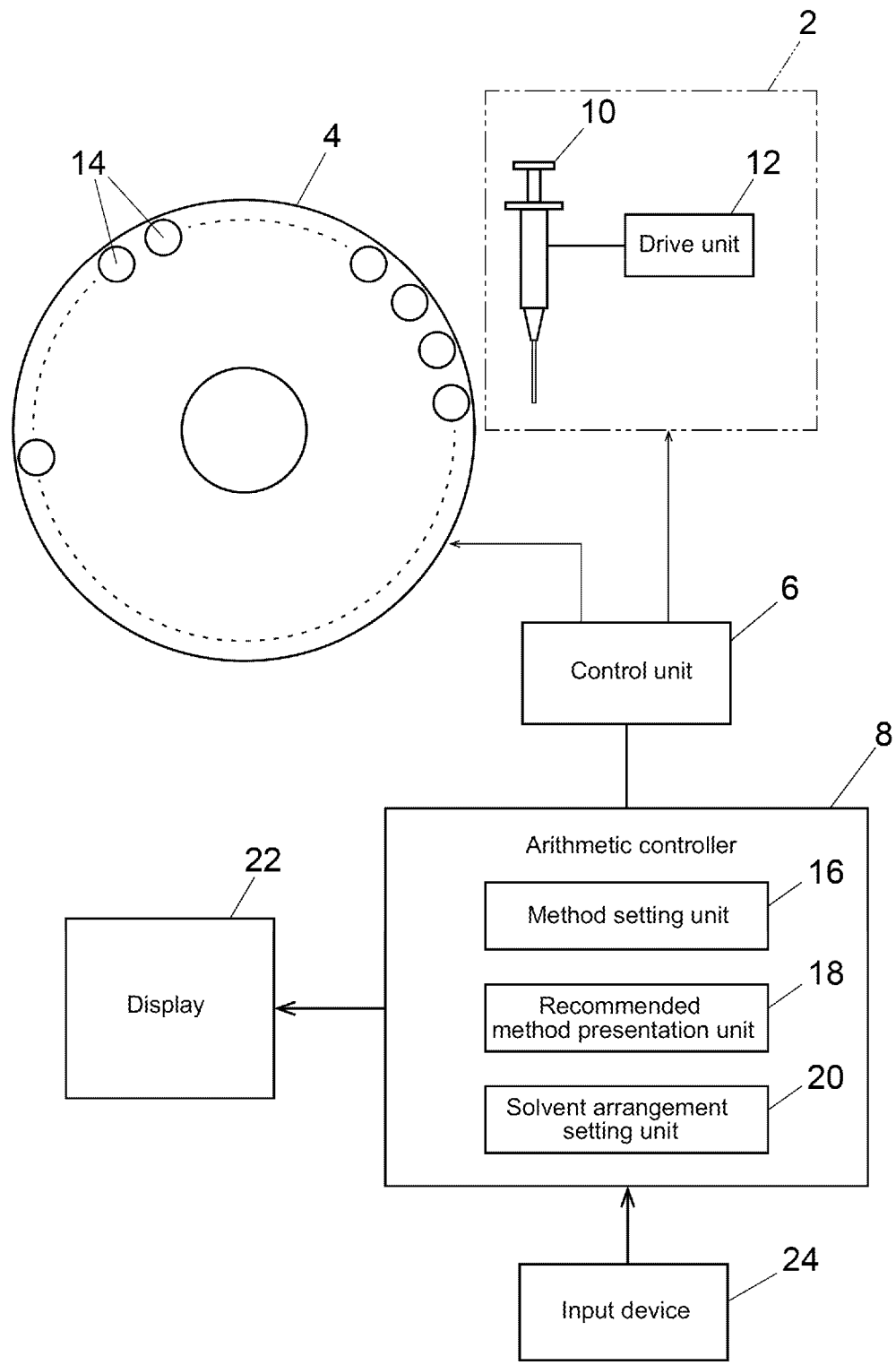
FIG. 1 is a schematic configuration diagram showing one example of an automatic sample injection device.

Hereinafter, with reference to the attached drawings, one example of an automatic sample injection device according to the present invention will be described.

As shown in FIG. 1, the automatic sample injection device is provided with a sampling mechanism 2, a turret 4, a control unit 6, and an arithmetic controller 8.

The sampling mechanism 2 is provided with a syringe 10 and a drive unit 12 for driving the syringe 10. The sampling mechanism 2 is for sucking and dispensing a sample and a solvent from vials arranged on the turret 4 by the syringe 10.

The turret 4 is a disk-shaped table. The turret 4 includes thereon a plurality of vial arrangement locations on the same circumference. The plurality of vial arrangement locations includes a solvent arrangement unit 14 for arranging a plurality of vials each accommodating a solvent. Note that on the turret 4, in addition to the solvent arrangement unit 14, a sample arrangement location for arranging a vial for accommodating a sample may be provided. Also note that the sample arrangement location may be provided at a location different from a location on the turret 4.

The control unit 6 is a function realized by an electronic circuit including a CPU (central processing unit) or the like. The control unit 6 is configured to control the sampling mechanism 2 and the turret 4 to analyze the respective samples arranged on the turret 4. The arithmetic controller 8 communicatively coupled to the control unit 6 is provided with a function of setting a method of a predetermined operation using the solvent arranged on the turret 4, such as, e.g., a cleaning operation of the sampling mechanism 2 before and after the sample injection. The control unit 6 controls the sampling mechanism 2 and the turret 4 so that a cleaning operation or the like is executed according to the method set by the arithmetic controller 8.

The arithmetic controller 8 is realized by a general-purpose personal computer or a dedicated computer. The arithmetic controller 8 is electrically connected to a display 22 for performing various information displays and an input device 24, such as, e.g., a keyboard. The arithmetic controller 8 is provided with a method setting unit 16, a recommended method presentation unit 18, and a solvent arrangement setting unit 20. The method setting unit 16, the recommended method presentation unit 18, and the solvent arrangement setting unit 20 are functions obtained by the CPU in the arithmetic controller 8 executing predetermined programs.

The method setting unit 16 is configured to set a method of a cleaning operation or the like based on the information input by a user via the input device 24. Specifically, when the user inputs an instruction to edit the method, the method setting unit 16 displays a method edit screen on the display 22. When the user inputs necessary information on the method edit screen, the method setting unit 16 sets the method based on the input information.

Here, the cleaning operation of the sampling mechanism 2 is an operation of sucking the solvent from the vial 14 on the turret 4 by the syringe 10 and discharging the solvent to a drain (not shown). The cleaning operation method is defined by the type of the solvent used in each of the cleaning operation before the sample injection and the cleaning operation after the sample injection, and the number of times of suction and discharge by the syringe 10.

The recommended method presentation unit 18 is a function for assisting the user when setting the method of the cleaning operation or the like. The recommended method presentation unit 18 is configured to, when setting the method, present a plurality of request items to the user and present a recommended method corresponding to the request item selected by the user from the presented plurality of request items to the user.

The request item is a set of items to be achieved. FIG. 3 shows one example of a request item list to be displayed when setting a cleaning operation method. The user can arbitrarily select a desired request item(s) from the displayed request item list. In FIG. 3, although two request items are selected, only one request item may be selected, or three or more request items may be selected.

The recommended method is a method constructed in advance so that the effect of each request item is achieved. Although not illustrated in FIG. 1, the arithmetic controller 8 is provided with a storage area storing the information relating to a recommended method corresponding to each request item. When the user selects a desired request item, the recommended method presentation unit 18 reads out a recommended method matching the selected request item and presents the recommended method to the user by displaying it on the display 22. The user can edit the parameter relating to the method by referring to the displayed recommended method, or can apply the parameter of the displayed recommended method as it is.

FIG. 4 shows one example of recommended methods prepared in advance corresponding to the selected request item. In the example shown in FIG. 4, for example, in a case where the user selects only the request item "reduction of carry-over," a recommended method is presented. The recommended method is configured such that four types of solvents A to D are used for the cleaning operation, the solvents C and D are used for the cleaning operation before the sample injection, and the solvents A and B are used for the cleaning operation after the sample injection. In this recommended method, in the cleaning before the sample injection, a solvent accommodated in a vial different from a vial accommodating a solvent used for the cleaning after the sample injection is used. Therefore, the cleaning effect in the syringe 10 is high, which can obtain an effect that the carry-over of the sample is small. In a case where the user selects only the request item "saving of solvent," a recommended method is presented. The recommended method is configured such that a solvent accommodated in a common vial for the injection operation before the sample injection and for the injection operation after the sample injection is used. Other than the above, as shown in FIG. 4, recommended methods corresponding to the case where a plurality of request items is simultaneously selected (for example, "reduction of carry-over"+"saving of solvent") are also prepared in advance.

Returning to FIG. 1, the description of this example will be continued. The solvent arrangement setting unit 20 of the arithmetic controller 8 is a function for setting a breakdown of the arrangement of solvents on the turret 4. The breakdown of the solvents to be arranged on the turret 4, that is, the number and the types of the solvents to be arranged, can be arbitrarily set by the user. In a case where four vials can be arranged on the solvent arrangement unit 14 on the turret 4, four types of solvents can be arranged at the solvent arrangement unit 14, or a plurality of solvents of the same type can be arranged on the solvent arrangement unit 14. For example, in a case where a cleaning operation method using two types of solvents A and B is set, the user can set such that two vials each accommodating solvents A and two vials each accommodating solvents B are arranged. In a case where a cleaning operation method using only one type of a solvent is set, the user can set such that a plurality of vials containing the same solvent is arranged. Note that it is not required to arrange vials at the entirety of the solvent arrangement unit 14, and in a case where the number of times of analyses is small, it is possible to set vials not to be arranged at a part of the solvent arrangement unit 14.

Further, the solvent arrangement setting unit 20 may be configured to automatically set the arrangement of solvents on the turret 4 suitable for the method set by the method setting unit 16. In that case, the arithmetic controller 8 is provided with a storage area on the turret 4 that stores solvent arrangement information on the turret 4 corresponding to each of the methods that may be set, and when a method is set by the method setting unit 16, the arrangement of solvents on the turret 4 is set to correspond to the set method, and the information relating to the number and the types of the solvents to be arranged on the solvent arrangement unit 14 is displayed on the display 22. By using the solvent arrangement automatic setting function, the user only needs to arrange solvents on the solvent arrangement unit 14 on the turret 4 according to the information displayed on the display 22, and the user itself is not required to set by considering the solvent arrangement suitable for the method.

One example of the operation at the time of setting the method in the automatic sample injection device of this example will be described using the flowchart of FIG. 2.

When the user inputs an instruction requiring the method edition to the arithmetic controller 8, the method setting unit 16 displays a method edit screen, and the recommended method presentation unit 18 displays a plurality of request items (Step 101). When the user selects the desired request item (Step 102), the recommended method presentation unit 18 presents a recommended method corresponding to the selected request item to the user by displaying it on the display 22 (Step 103). When the user edits and determines the information for the method by referring to the presented recommended method or applies the information on the presented recommended method as it is, the method setting unit 16 sets the method based on the information (Step 104). Subsequently, the user sets the arrangement of solvents on the turret 4 according to the set method, or the method setting unit 16 automatically sets the arrangement of solvents on the turret 4 based on the set method (Step 105).

Note that the example described above is merely an exemplary embodiment of automatic sample injection device according to the present invention. Embodiments of the automatic sample injection device according to the present invention are as follows.

One embodiment of the automatic sample injection device according to the present invention is directed to an automatic sample injection device configured to perform an injection operation of a sample to an analyzer by a sampling mechanism for sucking and dispensing a solvent. The automatic sample injection device is provided with:

- a solvent arrangement unit on which a plurality of solvents each accommodated in a vial is arranged;
- a method setting unit configured to set a method of a predetermined operation using the solvent based on information input by a user;
- a solvent arrangement setting unit configured to set the number and types of solvents to be arranged on the solvent arrangement unit; and
- a control unit configured to control the sampling mechanism to execute the predetermined operation with a method set by the method setting unit.

According to the first aspect of the above-described embodiment, the automatic sample injection device is further provided with a recommended method presentation unit configured to, when setting the method, present a plurality of request items to the user to present a recommended method corresponding to the selected request item to the user. With such an aspect, the user can refer to the know-how of the manufacturer's method, which makes it easier to construct a method to achieve the effects desired by the user.

According to the second aspect of the above-described embodiment, the solvent arrangement setting unit is configured to automatically set the number and the types of solvents to be arranged at the solvent arrangement locations, based on the method set by the method setting unit. With such an aspect, the setting of the solvent arrangement suitable for the set method can be simplified. This second aspect may be combined with the first aspect.

In the above-described embodiment, the predetermined operation may be a cleaning operation of the sampling mechanism before and after the injection operation.

Further, in the above-described embodiment, the analyzer may be a gas chromatograph.

DESCRIPTION OF SYMBOLS

2: Sampling mechanism
4: Turret
6: Control unit
8: Arithmetic controller
10: Syringe
12: Drive unit
14: Solvent arrangement unit
16: Method setting unit
18: Recommended method presentation unit
20: Solvent arrangement setting unit
22: Display
24: Input device

The invention claimed is:

1. An automatic sample injection device configured to perform an injection operation of a sample to an analyzer the automatic sample injection device comprising:
   a sampling mechanism configured to suck and dispense the sample and at least one cleaning solvent;
   at least one controlling device configured to control an operation of the sampling mechanism;
   an input device communicatively connected with the at least one controlling device and configured to input information from a user into the at least one controlling device;
   a display device communicatively connected with the at least one controlling device; and
   a storage device communicatively connected with the at least one controlling device and storing a plurality of recommended methods which are set corresponding to a plurality of request items each indicating an effect to be realized by a cleaning process using the sampling mechanism, and the plurality of recommended methods each including setting of types of cleaning solvents used for the cleaning process and setting of a number of cleanings using each type of the cleaning solvents in the cleaning process,
   wherein the at least one controlling device is configured to control the display device to display the plurality of request items to request selecting at least one request item from the plurality of request items to the user through the input device, to read out one of the plurality of recommended methods which corresponding to the at least request item selected by the user, and set the one of the plurality of recommended methods as a determined method, and
   wherein the at least one controlling device is configured to control the sampling mechanism to execute the cleaning process using the determined method.

2. The automatic sample injection device as recited in claim 1,
   wherein the analyzer is a gas chromatograph.

3. The automatic sample injection device as recited in claim 1,
   wherein the plurality of request items include reduction of carry-over, saving of solvent, use of three types of solvent, and use of viscous solvent.

4. The automatic sample injection device as recited in claim 1,
   wherein the at least one controlling device is configured so that the user can select two or more request items from the plurality of request items, and is configured to select the one of the plurality of recommended methods to be read out from the storage device based on combination of the selected two or more request items.

* * * * *